United States Patent
Ye et al.

(10) Patent No.: US 9,172,912 B2
(45) Date of Patent: Oct. 27, 2015

(54) TELEPRESENCE METHOD, TERMINAL AND SYSTEM

(75) Inventors: Xiaoyang Ye, Shenzhen (CN); Dong Wang, Shenzhen (CN); Yongming Wu, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 82 days.

(21) Appl. No.: 14/130,475
(22) PCT Filed: Mar. 21, 2012
(86) PCT No.: PCT/CN2012/072751
§ 371 (c)(1),
(2), (4) Date: Dec. 31, 2013
(87) PCT Pub. No.: WO2012/155660
PCT Pub. Date: Nov. 22, 2012

(65) Prior Publication Data
US 2014/0146129 A1 May 29, 2014

(30) Foreign Application Priority Data
Jul. 8, 2011 (CN) .......................... 2011 1 0191493

(51) Int. Cl.
*H04N 7/15* (2006.01)
*H04N 7/14* (2006.01)
*H04L 29/06* (2006.01)

(52) U.S. Cl.
CPC ............ *H04N 7/152* (2013.01); *H04L 65/1069* (2013.01); *H04L 65/403* (2013.01); *H04N 7/147* (2013.01); *H04N 7/15* (2013.01)

(58) Field of Classification Search
CPC ......... H04N 7/152; H04N 7/147; H04N 7/15; H04L 65/403; H04L 65/1069
USPC .......... 348/14.02, 14.08, 14.09, 14.12, 14.13, 348/14.16, 239, 14.01, 14.04, 14.1; 370/260, 261, 342, 468; 375/240.01; 379/93.08, 212.01; 709/204, 206, 227; 345/420; 705/5
See application file for complete search history.

(56) References Cited

U.S. PATENT DOCUMENTS 5,335,011 A 8/1994 Addeo
6,037,970 A 3/2000 Kondo (Continued)

FOREIGN PATENT DOCUMENTS

| CN | 1170315 A | 1/1998 |
| CN | 101911667 A | 12/2010 |
| EP | 1763241 A2 | 3/2007 |

OTHER PUBLICATIONS

International Search Report in international application No. PCT/CN2012/072751, mailed on Jul. 5, 2012.

(Continued)

*Primary Examiner* — Gerald Gauthier
(74) *Attorney, Agent, or Firm* — Oppedahl Patent Law Firm LLC

(57) ABSTRACT

The disclosure discloses a telepresence method, a telepresence terminal and a telepresence system. The system includes a telepresence terminal, multiple audio inputting devices and multiple audio outputting devices and/or multiple video inputting devices and multiple video outputting devices and a remote endpoint, wherein the telepresence terminal has multiple audio and video inputting and outputting interfaces for connecting the multiple audio inputting devices and the multiple audio outputting devices and/or the multiple video inputting devices and the multiple video outputting devices, and is configured to: establish a session, exchange input/output location information of multiple audio streams and/or video streams, perform media capability negotiation, and establish media logical channels with the remote endpoint; encode streams input by the multiple audio inputting devices and/or the multiple video inputting devices, and send the encoded streams to the remote endpoint according to input/output locations of the streams based on the established media logical channels; receive and decode multiple audio streams and/or video streams from the remote endpoint, and forward the decoded streams respectively to audio outputting devices and/or video outputting devices at local locations corresponding to input/output locations of the multiple audio streams and/or video streams received, so that the decoded streams are played by the audio outputting devices and/or the video outputting devices at the local locations. With the disclosure, problems of complicated deployment of an existing telepresence system, intercommunication and stream synchronization within the system are solved.

20 Claims, 4 Drawing Sheets

(56) References Cited

U.S. PATENT DOCUMENTS

| | | | | |
|---|---|---|---|---|
| 6,490,344 | B1* | 12/2002 | Murai et al. | 379/93.08 |
| 6,498,788 | B1* | 12/2002 | Emilsson et al. | 370/342 |
| 6,590,604 | B1* | 7/2003 | Tucker et al. | 348/14.13 |
| 7,606,181 | B1* | 10/2009 | Whynot et al. | 370/260 |
| 7,679,639 | B2* | 3/2010 | Harrell | H04N 7/144 348/14.08 |
| 7,692,680 | B2* | 4/2010 | Graham | H04N 7/15 348/14.01 |
| 7,710,448 | B2* | 5/2010 | De Beer | H04N 7/142 348/14.01 |
| 7,765,302 | B2* | 7/2010 | Whynot et al. | 709/227 |
| 8,072,481 | B1* | 12/2011 | McNelley et al. | 348/14.16 |
| 8,130,256 | B2* | 3/2012 | Trachtenberg | H04N 7/142 348/14.08 |
| 8,237,769 | B2* | 8/2012 | Crenshaw | H04N 7/142 348/14.01 |
| 8,305,422 | B2* | 11/2012 | Toya et al. | 348/14.08 |
| 8,384,759 | B2* | 2/2013 | Hagen et al. | 348/14.12 |
| 8,416,279 | B2* | 4/2013 | Pepperell | H04N 7/152 348/14.01 |
| 8,577,011 | B1* | 11/2013 | Madabhushi | 379/212.01 |
| 8,649,426 | B2* | 2/2014 | White et al. | 375/240.01 |
| 8,819,128 | B2* | 8/2014 | Murray, II | 709/204 |
| 8,928,659 | B2* | 1/2015 | Bar-Zeev | G06T 15/20 345/158 |
| 8,948,059 | B2* | 2/2015 | Rodman et al. | 370/261 |
| 8,953,671 | B2* | 2/2015 | Liao et al. | 375/240.01 |
| 8,996,619 | B1* | 3/2015 | McKnight et al. | 709/206 |
| 2005/0122392 | A1 | 6/2005 | Johansen | |
| 2006/0159124 | A1* | 7/2006 | Henry et al. | 370/468 |
| 2007/0064094 | A1 | 3/2007 | Potekhin | |
| 2007/0206091 | A1 | 9/2007 | Dunn | |
| 2007/0250567 | A1* | 10/2007 | Graham | H04L 12/18 709/204 |
| 2008/0246834 | A1 | 10/2008 | Lunde | |
| 2008/0273078 | A1 | 11/2008 | Grasley | |
| 2009/0079815 | A1 | 3/2009 | Baird | |
| 2010/0007773 | A1* | 1/2010 | O'Connell et al. | 348/239 |
| 2010/0033550 | A1 | 2/2010 | Johansen | |
| 2010/0274909 | A1 | 10/2010 | Mochida | |
| 2011/0071862 | A1* | 3/2011 | Cator | G06Q 10/10 705/5 |
| 2012/0236104 | A1* | 9/2012 | Fang et al. | 348/14.02 |
| 2013/0038677 | A1 | 2/2013 | Johansen et al. | |
| 2013/0335518 | A1* | 12/2013 | Ye et al. | 348/14.12 |
| 2014/0139618 | A1* | 5/2014 | Ye et al. | 348/14.09 |
| 2014/0146129 | A1* | 5/2014 | Ye | H04N 7/147 348/14.09 |
| 2014/0354766 | A1 | 12/2014 | Johansen et al. | |
| 2015/0249805 | | * 9/2015 | White | H04N 7/15 348/14.16 |

OTHER PUBLICATIONS

English Translation of the Written Opinion of the International Search Authority in international application No. PCT/CN2012/072751, mailed on Jul. 5, 2012.

Supplementary European Search Report in European application No. 12784928.9, mailed on Mar. 12, 2015.

* cited by examiner

TELEPRESENCE METHOD, TERMINAL AND SYSTEM

TECHNICAL FIELD

The disclosure relates to the telepresence technology, in particular, to a telepresence method, a telepresence terminal and a telepresence system.

BACKGROUND

Telepresence refers to an advanced remote videoconferencing system, and enjoys great popularity among high-end users due to a true sense of on-scene presence thereof. In a telepresence system, auditory positioning, life size imaging, and eye contact directly concern whether the users can have an immersive sensation, and therefore are key technical indicators in evaluating the telepresence system.

In a traditional videoconferencing system, in addition to providing a stream auxiliary to a video, a videoconferencing terminal generally serves to encode and send an audio stream and/or an video stream; and to receive, decode, and output an audio stream and/or an video stream. Since there are only one stream of sound input source and one stream of sound output, a user can not sense from which direction of a meeting room the sound comes. Since there are only one stream of video input source and one stream of video output, the whole meeting room has to be included in a collecting and encoding frame at a local end; for a multipoint conference, one can select to watch only the picture of one meeting room or a Mosaic picture of multiple remote meeting rooms; neither a sent video nor a received video can meet the requirement for life-size display.

In contrast, user experience required by the telepresence system is to have multiple audio and video streams, provide information on the direction from which each audio stream comes to achieve auditory positioning, and display a life-size image of a remote conferee based on a projected requirement, in which case one meeting room generally needs to be provided with multiple video inputs and multiple video outputs. At present, some telepresence terminals are obtained by integrating traditional videoconferencing terminals; specifically, multiple videoconferencing terminals are deployed in a single meeting room and each videoconferencing terminal may be connected to audio-video input/outputting devices respectively; and then substantial auditory positioning and life-size display are achieved through audio-video-input/output-device deploying and assembling techniques. However, with such integration of multiple videoconferencing terminals (wherein generally, when multiple videoconferencing terminals are deployed in a single meeting room, each videoconferencing terminal needs to be called respectively), it is difficult to call a single conference ID number, to implement stream synchronization or the like; what is more, integration of multiple terminals complicates system deployment, which then requires professional personnel of integration and deployment; any minor problem appearing in use requires on-site maintenance by professional personnel, thus posing a major obstacle to promotion of such a high-end application like the telepresence. Moreover, not all videoconferencing terminals are used fully employing functions thereof in the integrated system, leading to resource waste to some extent. In addition, such a complicated and non-standardized solution of integration makes it very difficult for telepresence systems deployed by different manufacturers to intercommunicate with each other.

SUMMARY

In view of this, it is desired that the disclosure provides a telepresence method, a telepresence terminal and a telepresence system, so as to solve problems of complicated deployment of an existing telepresence system and of difficulty in calling a single conference ID number and in stream synchronization.

To this end, a technical solution of the disclosure is implemented as follows.

The disclosure provides a telepresence system, including a telepresence terminal, multiple audio inputting devices and multiple audio outputting devices and/or multiple video inputting devices and multiple video outputting devices connected to the telepresence terminal, and a remote endpoint intercommunicating with the telepresence terminal, wherein the telepresence terminal has multiple audio and video inputting and outputting interfaces for connecting the multiple audio inputting devices and the multiple audio outputting devices and/or the multiple video inputting devices and the multiple video outputting devices, and is configured to: establish a session, exchange input/output location information of multiple audio streams and/or video streams, perform media capability negotiation, and establish media logical channels with the remote endpoint; encode streams input by the multiple audio inputting devices and/or the multiple video inputting devices, and send the encoded streams to the remote endpoint according to input/output locations of the streams based on the established media logical channels; receive and decode multiple audio streams and/or video streams from the remote endpoint, and forward the decoded streams respectively to audio outputting devices and/or video outputting devices at local locations corresponding to input/output locations of the multiple audio streams and/or video streams received, so that the decoded streams are played by the audio outputting devices and/or the video outputting devices at the local locations;

the multiple audio inputting devices are configured to input collected audio data to the telepresence terminal;

the multiple video inputting devices are configured to input collected video data to the telepresence terminal;

the multiple audio outputting devices are configured to output audio data decoded by the telepresence terminal;

the multiple video outputting devices are configured to output video data decoded by the telepresence terminal; and the remote endpoint is configured to: exchange the input/output location information of the multiple audio streams and/or video streams, perform media capability negotiation, establish the media logical channels with the telepresence terminal, and exchange audio and/or video streams with the telepresence terminal based on the established media logical channels.

The telepresence terminal may be configured to exchange the input/output location information of the multiple audio streams and/or video streams and perform media capability negotiation by sending the remote endpoint a capability set of the local telepresence terminal including local media encoding/decoding capability and input/output location information of audio and/or video streams of the local telepresence terminal, and receiving a capability set of the remote endpoint including media encoding/decoding capability of the remote endpoint and input/output location information of audio and/or video streams at the remote endpoint.

The media logical channels may include a sending channel and a receiving channel;

multiple audio streams may be sent through one sending channel and received through one receiving channel; and/or multiple video streams may be sent through one sending channel and received through one receiving channel; and the audio streams and/or the video streams may be distinguished by packet header information including a type of a stream, and input location information and output location information corresponding to the stream.

The media logical channels may include sending channels and receiving channels;

multiple audio streams may be sent respectively through different sending channels and received through different receiving channels; and/or multiple video streams may be sent respectively through different sending channels and received through different receiving channels; and a corresponding relation may be established between each sending channel and the type and the input/output location information of each audio stream and/or video stream; and a corresponding relation may be established between each receiving channel and the type and the input/output location information of each audio stream and/or video stream.

The telepresence terminal may be further configured to: establish a sending channel according to negotiated media encoding/decoding capability, a local sending address and a remote receiving address, output location information of a remote audio stream or video stream corresponding to the sending channel to be established, and input location information of a local audio stream or video stream; and establish a receiving channel according to negotiated media encoding/decoding capability, a remote sending address and a local receiving address, input location information of a remote audio stream or video stream corresponding to the receiving channel to be established, and output location information of a local audio stream or video stream.

The telepresence terminal may be further configured to synchronize the sent and/or received multiple audio streams and/or video streams.

The remote endpoint may be a Multipoint Control Unit (MCU) or a remote telepresence terminal.

The disclosure further provides a telepresence terminal having multiple audio and video inputting and outputting interfaces for connecting multiple audio inputting devices and multiple audio outputting devices and/or multiple video inputting devices and multiple video outputting devices, the telepresence terminal including: a protocol signalling processing module, a media encoding/decoding module and a media transfer module, wherein the protocol signalling processing module is configured to: establish a session, exchange input/output location information of multiple audio streams and/or video streams, perform media capability negotiation, and establish media logical channels with a remote endpoint;

the media encoding/decoding module is configured to: encode streams input by the multiple audio inputting devices and/or the multiple video inputting devices, and provide the encoded streams to the media transfer module; decode audio streams and/or video streams from the remote endpoint provided by the media transfer module, and forward the decoded streams respectively to audio outputting devices and/or video outputting devices at local locations corresponding to input/output locations of the audio streams and/or video streams received, so that the decoded streams are played by the audio outputting devices and/or the video outputting devices at the local locations; and the media transfer module is configured to: send the encoded streams to the remote endpoint according to input/output locations of the streams; receive the audio and/or video streams from the remote endpoint, and provide, according to input/output locations of the audio and/or video streams from the remote endpoint, the audio and/or video streams from the remote endpoint to the media encoding/decoding module to decode.

The protocol signalling processing module may be configured to exchange the input/output location information of the multiple audio streams and/or video streams and perform media capability negotiation by sending the remote endpoint a capability set of the local telepresence terminal including local media encoding/decoding capability and input/output location information of audio and/or video streams of the local telepresence terminal, and receiving a capability set of the remote endpoint including media encoding/decoding capability of the remote endpoint and input/output location information of audio and/or video streams at the remote endpoint.

The media logical channels may include a sending channel and a receiving channel;

multiple audio streams may be sent through one sending channel and received through one receiving channel; and/or multiple video streams may be sent through one sending channel and received through one receiving channel; and the audio streams and/or the video streams may be distinguished by packet header information including a type of a stream, and input location information and output location information corresponding to the stream.

The media logical channels may include sending channels and receiving channels;

multiple audio streams may be sent respectively through different sending channels and received through different receiving channels; and/or multiple video streams may be sent respectively through different sending channels and received through different receiving channels; and a corresponding relation may be established between each sending channel and the type and the input/output location information of each audio stream and/or video stream; and a corresponding relation may be established between each receiving channel and the type and the input/output location information of each audio stream and/or video stream.

The protocol signalling processing module may be further configured to:

establish a sending channel according to negotiated media encoding/decoding capability, a local sending address and a remote receiving address, output location information of a remote audio stream or video stream corresponding to the sending channel to be established, and input location information of a local audio stream or video stream; and establish a receiving channel according to negotiated media encoding/decoding capability, a remote sending address and a local receiving address, input location information of a remote audio stream or video stream corresponding to the receiving channel to be established, and output location information of a local audio stream or video stream.

The media transfer module may be further configured to synchronize the sent and/or received multiple audio streams and/or video streams.

The disclosure further provides a telepresence method, wherein a telepresence terminal has multiple audio and video inputting and outputting interfaces for connecting multiple audio inputting devices and multiple audio outputting devices and/or multiple video inputting devices and multiple video outputting devices, the method including that:

a session is established, input/output location information of multiple audio streams and/or video streams is exchanged, media capability negotiation is performed, and media logical channels are established between the telepresence terminal and the remote endpoint;

the telepresence terminal encodes streams input by the multiple audio inputting devices and/or the multiple video inputting devices, and sends the encoded streams to the remote endpoint according to input/output locations of the streams based on the established media logical channels; receives and decodes multiple audio streams and/or video streams from the remote endpoint, and forwarding the decoded streams respectively to audio outputting devices and/or video outputting devices at local locations corresponding to input/output locations of the multiple audio streams and/or video streams received, so that the decoded streams are played by the audio outputting devices and/or the video outputting devices at the local locations.

The exchanging input/output location information of multiple audio streams and/or video streams, performing media capability negotiation may include that:

the telepresence terminal may send the remote endpoint a capability set of the local telepresence terminal including local media encoding/decoding capability and input/output location information of audio and/or video streams of the local telepresence terminal, and receive a capability set of the remote endpoint including media encoding/decoding capability of the remote endpoint and input/output location information of audio and/or video streams at the remote endpoint.

The media logical channels may include a sending channel and a receiving channel;

multiple audio streams may be sent through one sending channel and received through one receiving channel; and/or multiple video streams may be sent through one sending channel and received through one receiving channel; and the audio streams and/or the video streams may be distinguished by packet header information including a type of a stream, and input location information and output location information corresponding to the stream.

The media logical channels may include sending channels and receiving channels;

multiple audio streams may be sent respectively through different sending channels and received through different receiving channels; and/or multiple video streams may be sent respectively through different sending channels and received through different receiving channels; and a corresponding relation may be established between each sending channel and the type and the input/output location information of each audio stream and/or video stream; and a corresponding relation is established between each receiving channel and the type and the input/output location information of each audio stream and/or video stream.

The establishing media logical channels may include that:

a sending channel may be established according to negotiated media encoding/decoding capability, a local sending address and a remote receiving address, output location information of a remote audio stream or video stream corresponding to the sending channel to be established, and input location information of a local audio stream or video stream; and a receiving channel may be established according to negotiated media encoding/decoding capability, a remote sending address and a local receiving address, input location information of a remote audio stream or video stream corresponding to the receiving channel to be established, and output location information of a local audio stream or video stream.

The telepresence method may further include that: the telepresence terminal synchronizes the sent and/or received multiple audio streams and/or video streams.

The remote endpoint may be a Multipoint Control Unit (MCU) or a remote telepresence terminal.

With the telepresence method, telepresence terminal and telepresence system provided by the disclosure, a telepresence terminal has multiple audio and video inputting and outputting interfaces capable of connecting multiple audio inputting devices and audio outputting devices and/or video inputting devices and video outputting devices; thus, it is only required to deploy one telepresence terminal for a single meeting room such that multiple audio and/or video streams may be processed; the deployment is simple, and a call with a single conference ID number can be implemented. As multiple streams of audio and/or video data are collected in a single meeting room, the data source is more accurate. As each audio and/or video inputting device collects data within a relatively fixed range, auditory positioning and life-size display required by a telepresence system can be achieved.

DETAILED DESCRIPTION

A technical solution of the disclosure is further elaborated below with reference to accompanying drawings and specific embodiments.

Figure 1:
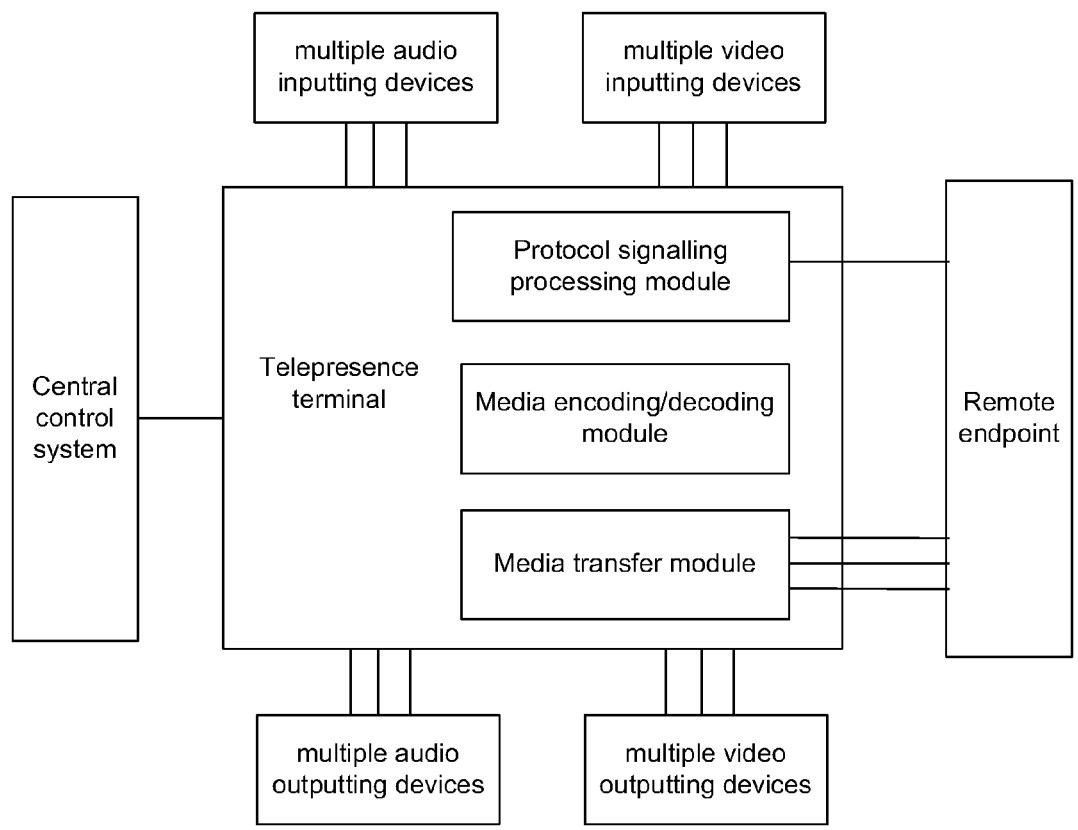
FIG. 1 shows a schematic diagram of a structure of a telepresence system according to an embodiment of the disclosure.

The disclosure provides a telepresence system which, as shown in FIG. 1, mainly includes a telepresence terminal, multiple audio inputting devices and multiple audio outputting devices and/or multiple video inputting devices and multiple video outputting devices connected to the telepresence terminal, and a remote endpoint intercommunicating with the telepresence terminal, wherein the telepresence terminal has multiple audio and video inputting and outputting interfaces for connecting the multiple audio inputting devices and the multiple audio outputting devices and/or the multiple video inputting devices and the multiple video outputting devices, can accomplish collection, input, encoding, decoding, output, playing, and synchronization of multiple audio and/or video streams, and is configured to establish a session, exchange input/output location information of multiple audio streams and/or video streams, perform media capability negotiation, and establish media logical channels with the remote endpoint; encode streams input by the multiple audio inputting devices and/or the multiple video inputting devices, and send the encoded streams to the remote endpoint according to input/output locations of the streams based on the established media logical channels; receive and decode multiple audio streams and/or video streams from the remote endpoint, and forward the decoded streams respectively to audio outputting devices and/or video outputting devices at local locations corresponding to input/output locations of the multiple audio streams and/or video streams received, so that the decoded streams are played by the audio outputting devices and/or the video outputting devices at the local locations;

the multiple audio inputting devices are configured to input audio data collected by an audio collecting terminal to the telepresence terminal;

the multiple video inputting devices are configured to input video data collected by a video collecting terminal to the telepresence terminal;

the multiple audio outputting devices are configured to output audio data decoded by the telepresence terminal to a corresponding audio device to play;

the multiple video outputting devices are configured to output video data decoded by the telepresence terminal to a corresponding video device to play; and the remote endpoint is configured to exchange the input/output location information of the multiple audio streams and/or video streams, perform media capability negotiation, establish the media logical channels with the telepresence terminal, and exchange audio and/or video streams with the telepresence terminal based on the established media logical channels.

In an embodiment, the telepresence terminal is configured to exchange the input/output location information of the multiple audio streams and/or video streams and perform media capability negotiation by sending the remote endpoint a capability set of the local telepresence terminal including local media encoding/decoding capability and input/output location information of audio and/or video streams of the local telepresence terminal, and receiving a capability set of the remote endpoint including media encoding/decoding capability of the remote endpoint and input/output location information of audio and/or video streams at the remote endpoint.

In an embodiment, the media logical channels include a sending channel and a receiving channel, wherein multiple audio streams may be sent through one sending channel and received through one receiving channel; and/or multiple video streams may be sent through one sending channel and received through one receiving channel; and the audio streams and/or the video streams may be distinguished by packet header information including at least a type of a stream, and input location information and output location information corresponding to the stream.

Or, multiple audio streams may be sent respectively through different sending channels and received through different receiving channels; and/or multiple video streams may be sent respectively through different sending channels and received through different receiving channels; and a corresponding relation may be established between each sending channel and the type and the input/output location information of each audio stream and/or video stream; and a corresponding relation may be established between each receiving channel and the type and the input/output location information of each audio stream and/or video stream.

The telepresence terminal may be further configured to:

establish a sending channel according to negotiated media encoding/decoding capability, a local sending address and a remote receiving address, output location information of a remote audio stream or video stream corresponding to the sending channel to be established, and input location information of a local audio stream or video stream; and establish a receiving channel according to negotiated media encoding/decoding capability, a remote sending address and a local receiving address, input location information of a remote audio stream or video stream corresponding to the receiving channel to be established, and output location information of a local audio stream or video stream.

The telepresence terminal is further configured to synchronize the sent and/or received multiple audio streams and/or video streams.

In an embodiment, the telepresence terminal may further include a protocol signalling processing module, a media encoding/decoding module and a media transfer module, where the protocol signalling processing module is configured to: establish a session, exchange input/output location information of multiple audio streams and/or video streams, perform media capability negotiation, and establish media logical channels with a remote endpoint;

the media encoding/decoding module is configured to: encode streams input by the multiple audio inputting devices and/or the multiple video inputting devices, and provide the encoded streams to the media transfer module; decode audio streams and/or video streams from the remote endpoint provided by the media transfer module, and forward the decoded streams respectively to audio outputting devices and/or video outputting devices at local locations corresponding to input/output locations of the audio streams and/or video streams received, so that the decoded streams are played by the audio outputting devices and/or the video outputting devices at the local locations; and the media transfer module is in charge of receiving and sending multiple audio streams and/or video streams, and is configured to: send the encoded streams to the remote endpoint according to input/output locations of the streams; receive the audio and/or video streams from the remote endpoint, and provide, according to input/output locations of the audio and/or video streams from the remote endpoint, the audio and/or video streams from the remote endpoint to the media encoding/decoding module to decode.

The protocol signalling processing module may be configured to exchange the input/output location information of the multiple audio streams and/or video streams and perform media capability negotiation by sending the remote endpoint a capability set of the local telepresence terminal including local media encoding/decoding capability and input/output location information of audio and/or video streams of the local telepresence terminal, and receiving a capability set of the remote endpoint including media encoding/decoding capability of the remote endpoint and input/output location information of audio and/or video streams at the remote endpoint.

The protocol signalling processing module may be further configured to:

establish a sending channel according to negotiated media encoding/decoding capability, a local sending address and a remote receiving address, output location information of a remote audio stream or video stream corresponding to the sending channel to be established, and input location information of a local audio stream or video stream; and establish a receiving channel according to negotiated media encoding/decoding capability, a remote sending address and a local receiving address, input location information of a remote audio stream or video stream corresponding to the receiving channel to be established, and output location information of a local audio stream or video stream.

The media transfer module may be further configured to synchronize the sent and/or received multiple audio streams and/or video streams.

Noted that during specific implementation, the media encoding/decoding module can be deployed either as an intrinsic part or an externally connected component of the telepresence terminal; either way, the media encoding/decoding module implements the same function.

In addition, the remote endpoint may be a Multipoint Control Unit (MCU) or a remote telepresence terminal. The telepresence terminal implements the same function when interacting with the MCU serving as the remote endpoint and with a remote telepresence terminal serving as the remote endpoint.

In an embodiment, the system shown in FIG. 1 may further include a central control system connected to the telepresence terminal, the central control system being configured to provide a user operation interface (for initiating a call or the like) to implement interaction with a user.

Figure 2:
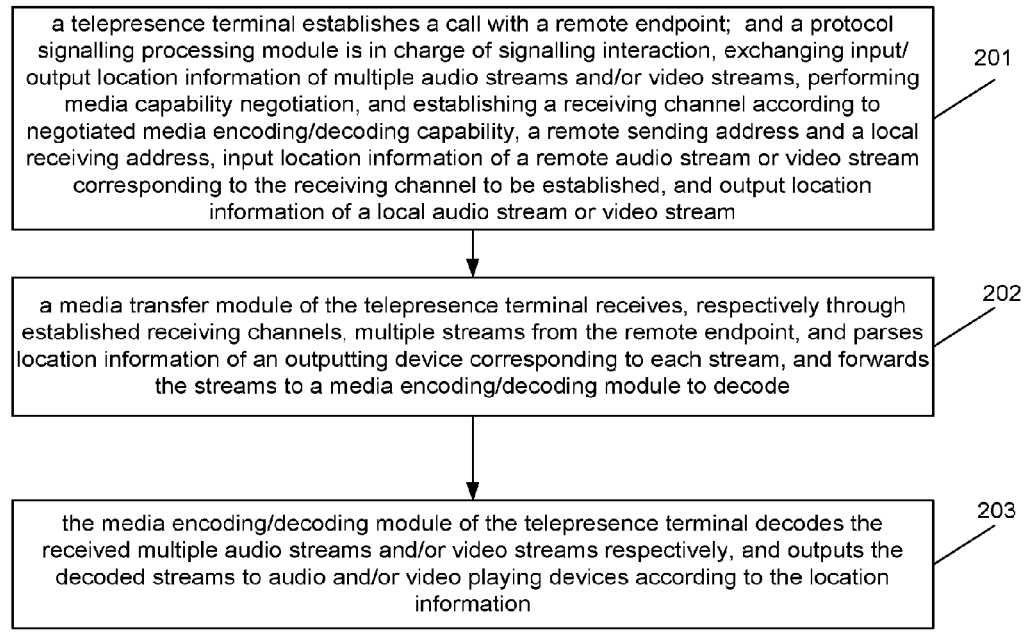
FIG. 2 shows a schematic diagram of a stream receiving process in a telepresence method according to Embodiment 1 of the disclosure.

A stream receiving process of a telepresence method according to Embodiment 1 of the disclosure is elaborated with reference to the system shown in FIG. 1, wherein multiple audio streams are received respectively through different receiving channels and multiple video streams are received respectively through different receiving channels, for example; as shown FIG. 2, the stream receiving process mainly includes the following steps.

Step 201: a telepresence terminal establishes a call with a remote endpoint; and a protocol signalling processing module is in charge of signalling interaction, exchanging input/output location information of multiple audio streams and/or video streams, performing media capability negotiation, and establishing a receiving channel according to negotiated media encoding/decoding capability, a remote sending address and a local receiving address, input location information of a remote audio stream or video stream corresponding to the receiving channel to be established, and output location information of a local audio stream or video stream.

First, a telepresence system including at least a telepresence terminal and multiple audio inputting devices and multiple audio outputting devices and/or multiple video inputting devices and multiple video outputting devices is constructed, wherein the telepresence terminal has multiple audio input interfaces, multiple audio output interfaces, multiple video input interfaces, and multiple video output interfaces connected respectively to the corresponding audio and/or video inputting and outputting devices; wherein by corresponding, it means that the media types (audio and/or video) of a device and an interface are consistent and location information of the device and the interface are consistent. The telepresence terminal is connected to a network and is registered on a Gatekeeper, and offers the outside a registered end ID or IP address. The Gatekeeper is a switching server adopting a soft switch mode and is in charge of signal switching and controlling on a VoIP network.

The telepresence terminal establishes a connection with the remote endpoint (which may be an MCU or a remote telepresence terminal), and a point-to-point conference or a multi-point conference may be established; the local telepresence terminal may initiate a call actively, or may accept a call from the remote telepresence terminal. The call connection includes: session establishment, information exchange and media capability (encoding/decoding capability) negotiation between the local and the remote telepresence terminals.

The media logical channels include a sending channel and a receiving channel, and specifically refers to a receiving channel in this embodiment. The process of establishing a receiving channel includes that: the remote endpoint sends the local telepresence terminal an openLogicalChannel message carrying a sending address (an IP address and a port number) of the remote endpoint, the negotiated media encoding/decoding capability, and the location information of an inputting device; then, the local telepresence terminal returns to the remote endpoint an acknowledging ACK message carrying a receiving address (an IP address and a port number) of the local telepresence terminal and the location information of a local outputting device. Channel information includes the sending address and the receiving address corresponding to a media logical channel, the media encoding/decoding capability, the location information of the audio and/or video inputting device, the location information of the audio and/or video outputting device, a transmitting channel identifier and so on.

Multiple audio streams may be sent respectively through different sending channels and received through different receiving channels; and/or multiple video streams may be sent respectively through different sending channels and received through different receiving channels.

A corresponding relation may be established between each sending channel and the type and the input/output location information of each audio stream and/or video stream; and a corresponding relation may be established between each receiving channel and the type and the input/output location information of each audio stream and/or video stream.

Step 202: a media transfer module of the telepresence terminal receives, respectively through established receiving channels, multiple streams from the remote endpoint, and parses location information of an outputting device corresponding to each stream, and forwards the streams to a media encoding/decoding module to decode.

Specifically, the media transfer module of the telepresence terminal receives, through the established media receiving logical channels, the streams sent by the remote endpoint, parses stream distinguishing information (such as a stream type, location information and the like) optionally as needed, parses the location information of the outputting device corresponding to each stream, and forwards the streams to the media encoding/decoding module to decode.

Step 203: the media encoding/decoding module of the telepresence terminal decodes the received multiple audio streams and/or video streams respectively, and outputs the decoded streams to audio and/or video playing devices according to the location information.

Figure 3:
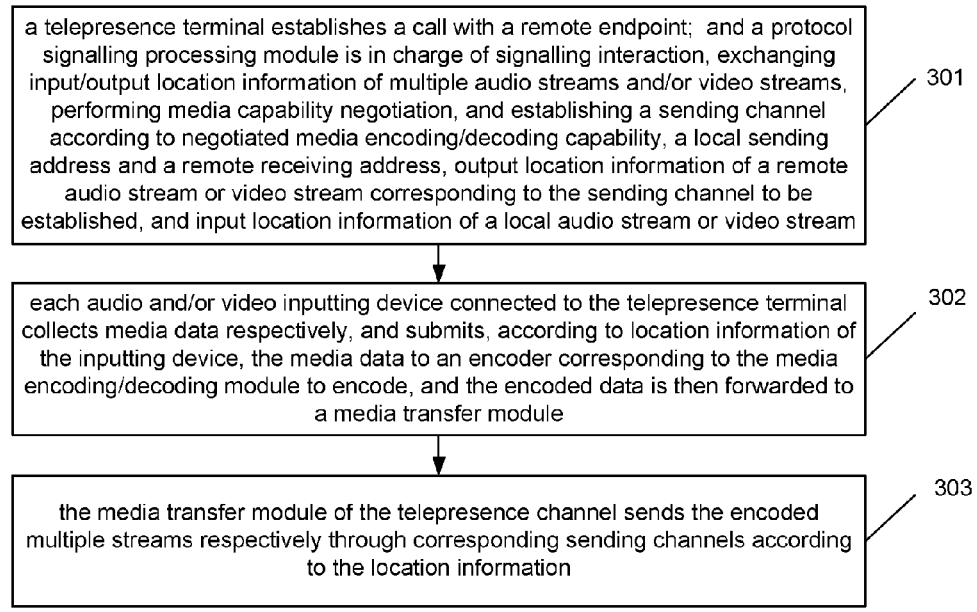
FIG. 3 shows a schematic diagram of a stream sending process in a telepresence method according to Embodiment 2 of the disclosure.

A stream sending process of a telepresence method according to Embodiment 2 of the disclosure is elaborated with reference to the system shown in FIG. 1, wherein multiple audio streams are sent respectively through different sending channels and multiple video streams are sent respectively through different sending channels, for example; as shown FIG. 3, the stream sending process mainly includes the following steps.

Step 301: a telepresence terminal establishes a call with a remote endpoint; and a protocol signalling processing module is in charge of signalling interaction, exchanging input/output location information of multiple audio streams and/or video streams, performing media capability negotiation, and establishing a sending channel according to negotiated media encoding/decoding capability, a local sending address and a remote receiving address, output location information of a remote audio stream or video stream corresponding to the sending channel to be established, and input location information of a local audio stream or video stream.

The specific operation of Step 301 is similar to that of Step 201, and is not repeated here. A media logical channel in this embodiment specifically refers to a sending channel. The process of establishing the media logical channels includes:

the local telepresence terminal sends the remote endpoint a sending address (an IP address and a port number), the negotiated media encoding/decoding capability and the location information of an inputting device; then, the remote endpoint returns to the local telepresence terminal a remote receiving address (an IP address and a port number) and the location information of a remote outputting device. Channel information includes the sending address and the receiving address corresponding to a media logical channel, the media encoding/decoding capability, the location information of the audio and/or video inputting device, the location information of the audio and/or video outputting device, a channel identifier and so on.

Step 302: each audio and/or video inputting device connected to the telepresence terminal collects media data respectively, and submits, according to location information of the inputting device, the media data to an encoder corresponding to the media encoding/decoding module to encode, and the encoded data is then forwarded to a media transfer module.

An external audio and/or video device connected to the telepresence terminal collects an audio and/or video stream; then the media encoding/decoding module encodes the stream according to the negotiated media capability and forwards the encoded stream to the media transfer module such that the encoded stream is sent through a corresponding media sending logical channel previously established, wherein the sent stream optionally carries stream distinguishing information (such as a stream type, location information and the like) as needed.

Step 303: the media transfer module of the telepresence channel sends the encoded multiple streams respectively through corresponding sending channels according to the location information.

According to the established corresponding relation between each sending channel and the type and the input/output location information of each audio stream and/or video stream, the media transfer module of the telepresence terminal selects a corresponding sending channel to send a stream according to the location information of an inputting device corresponding to the stream.

When completing the conference, each of the media logical channels needs to be closed first; then, the telepresence terminal deletes the session with the remote endpoint.

Figure 4:
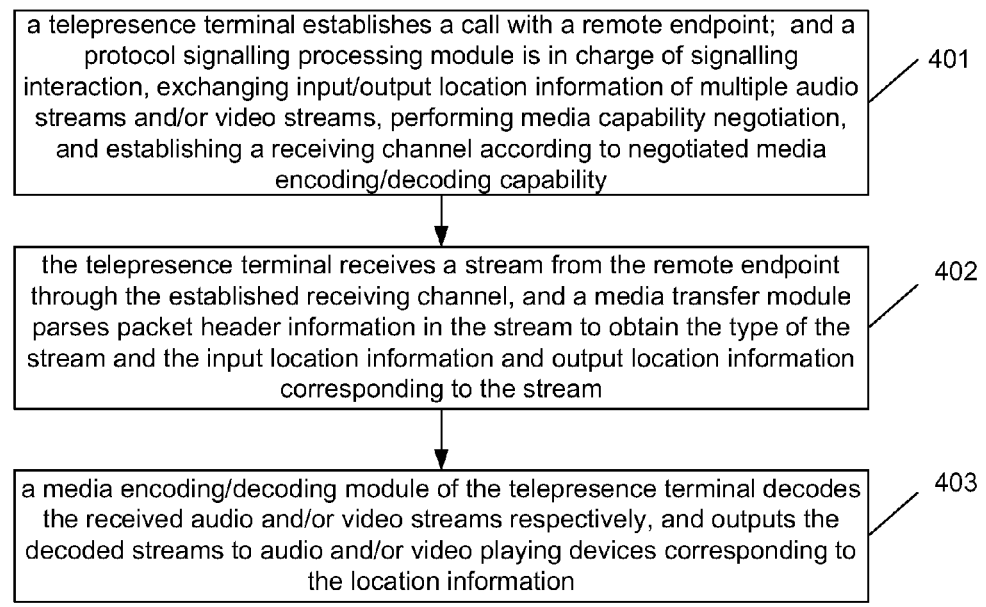
FIG. 4 shows a schematic diagram of a stream receiving process in a telepresence method according to Embodiment 3 of the disclosure.

A stream receiving process of a telepresence method according to Embodiment 3 of the disclosure is elaborated with reference to the system shown in FIG. 1, wherein multiple audio streams are received through one receiving channel and multiple video streams are received through one receiving channel, for example; as shown FIG. 4, the stream receiving process mainly includes the following steps.

Step 401: a telepresence terminal establishes a call with a remote endpoint; and a protocol signalling processing module is in charge of signalling interaction, exchanging input/output location information of multiple audio streams and/or video streams, performing media capability negotiation, and establishing a receiving channel according to negotiated media encoding/decoding capability.

In this embodiment, only one audio channel for audio stream sending and receiving and one video channel for video stream sending and receiving are established between the telepresence terminal and the remote endpoint.

Step 402: the telepresence terminal receives a stream from the remote endpoint through the established receiving channel, and a media transfer module parses packet header information in the stream to obtain the type of the stream and the input location information and output location information corresponding to the stream.

Step 403: a media encoding/decoding module of the telepresence terminal decodes the received audio and/or video streams respectively, and outputs the decoded streams to audio and/or video playing devices corresponding to the location information to play.

Figure 5:
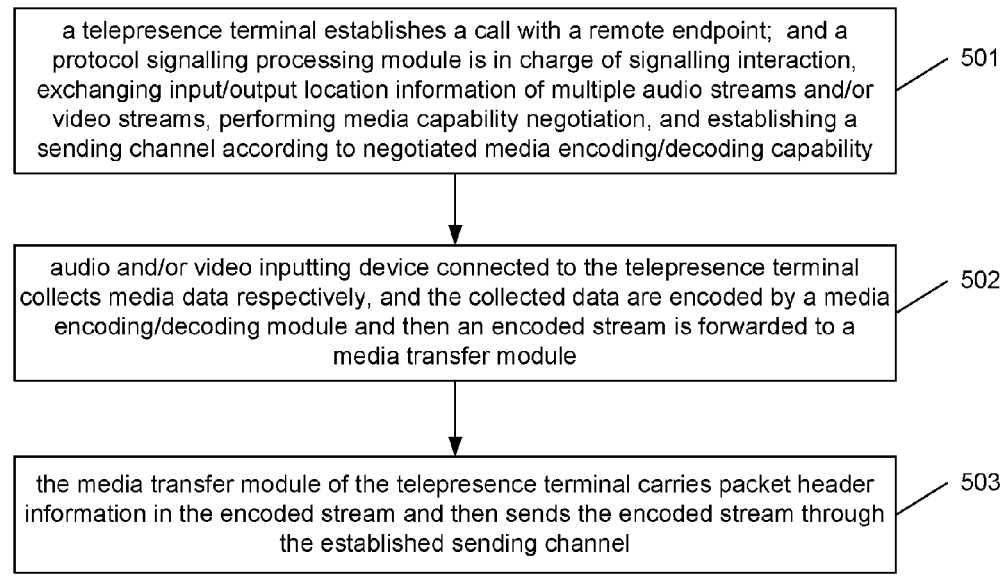
FIG. 5 shows a schematic diagram of a stream sending process in a telepresence method according to Embodiment 4 of the disclosure.

A stream sending process of a telepresence method according to Embodiment 4 of the disclosure is elaborated with reference to the system shown in FIG. 1, wherein multiple audio streams are sent through one sending channel and multiple video streams are sent through one sending channel, for example; as shown FIG. 5, the stream sending process mainly includes the following steps.

Step 501: a telepresence terminal establishes a call with a remote endpoint; and a protocol signalling processing module is in charge of signalling interaction, exchanging input/output location information of multiple audio streams and/or video streams, performing media capability negotiation, and establishing a sending channel according to negotiated media encoding/decoding capability.

In this embodiment, only one audio channel for audio stream sending and receiving and one video channel for video stream sending and receiving are established between the telepresence terminal and the remote endpoint.

Step 502: audio and/or video inputting device connected to the telepresence terminal collects media data respectively, and the collected data are encoded by a media encoding/decoding module and then an encoded stream is forwarded to a media transfer module.

Step 503: the media transfer module of the telepresence terminal carries packet header information in the encoded stream and then sends the encoded stream through the established sending channel.

The packet header information at least includes: a type of a stream, and input location information and output location information corresponding to the stream.

Noted that in an embodiment of the disclosure, multiple audio streams may be mixed into one stream which is sent through one sending channel and received through one receiving channel, while multiple video streams are sent through multiple sending channels and received through multiple receiving channels, respectively; in an embodiment of the disclosure, multiple video streams may be mixed into one stream which is sent through one sending channel and received through one receiving channel, while multiple audio streams are sent through multiple sending channels and received through multiple receiving channels, respectively. The implementation of sending through one sending channel and receiving through one receiving channel is similar to operations shown in FIG. 5 and FIG. 4; the implementation of sending through multiple sending channels respectively and receiving through multiple receiving channels respectively is similar to operations shown in FIG. 3 and FIG. 2, which are not repeated here.

Figure 6:
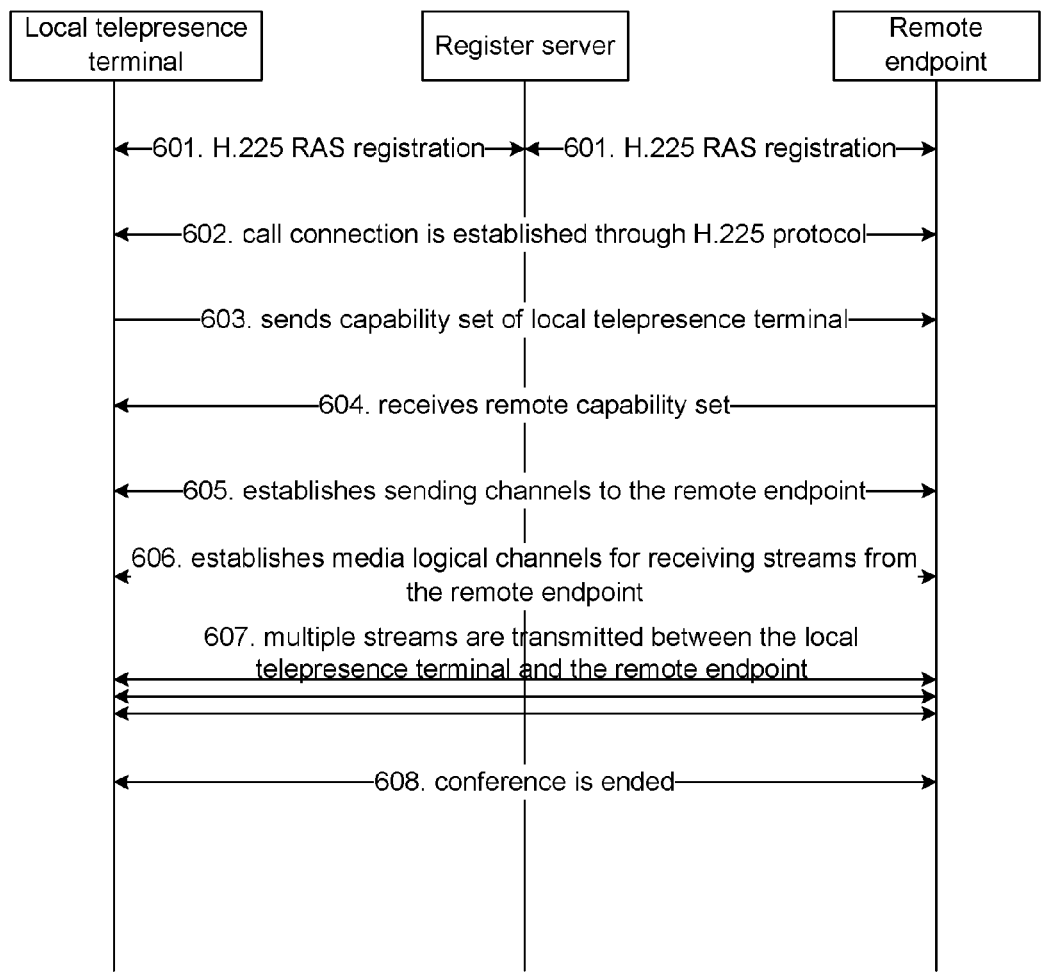
FIG. 6 shows a flowchart of a telepresence method according to an embodiment of the disclosure.

The telepresence method according to the disclosure is further elaborated below with an example of three audio and video inputting and outputting interfaces as an example. First, a telepresence system of this embodiment, including at least a telepresence terminal and multiple audio inputting devices and multiple audio outputting devices and/or multiple video inputting devices and multiple video outputting devices, is constructed, wherein the telepresence terminal includes three audio inputting interfaces and three audio outputting interfaces, and three video inputting interfaces and three video outputting interfaces, respectively; each of the audio inputting devices and the audio outputting devices and/or the video inputting devices and the video outputting device is connected respectively to a correct interface of the telepresence terminal. In this embodiment, multiple audio and/or video streams are sent respectively through different sending channels and received respectively through different receiving channels. As shown in FIG. 6, the specific process includes the following steps.

Step 601: a telepresence terminal (that is, a local telepresence terminal) is connected to a network and is registered on a register server Gatekeeper through an H.225 RAS protocol, and offers the outside a registered H.323 ID or IP address.

Step 602: the telepresence terminal establishes a connection with the remote endpoint (which may be an MCU or a remote telepresence terminal) through an H.225 protocol, and a point-to-point conference or a multi-point conference may be established; the local telepresence terminal may initiate a call actively, or may accept a call from the remote telepresence terminal; and a call signalling includes the IP address and/or an H.323 ID of the telepresence terminal.

Step 603: after the local telepresence terminal establishes an H.225 call connection with the remote endpoint, the local telepresence terminal constructs local capability set and sends the local capability set to the remote endpoint, and receives feedback information from the remote endpoint, wherein the capability set includes: decoding capability and parameters and locations of interfaces connected to external audio outputting devices for three audio outputs, for example, 1, 2 and 3 are used to indicate left audio output, middle audio output and right audio output, respectively; and decoding capability and parameters, and locations of interfaces connected to external video outputting devices for three video outputs. For example, left, middle and right audio descriptors, and left, middle and right video descriptors are added in the structure of an H.245 message terminalCapabilitySet, and different values are used to indicate different types and locations, for example, 1, 2 and 3 are used to indicate left, middle and right audios respectively, and 4, 5 and 6 are used to indicate left, middle and right videos respectively.

Step 604: the local telepresence terminal receives a capability set of the remote endpoint and feeds back information. For example, the remote endpoint supports decoding and outputting three video streams, including H.264, H.263 decoding, and supports outputting three audio streams, including G.711, G.728 decoding; a result of capability negotiation is obtained according to the location of an interface connected to an external audio and/or video outputting device carried in the capability set of the remote endpoint, and the location of an interface of the local telepresence terminal connecting an external audio and/or video inputting device; after the negotiation, the stream at the left audio inputting interface of the local telepresence terminal is encoded in G.711 and sent to the left audio outputting interface of the remote endpoint, and the stream at the left video inputting interface of the local telepresence terminal is encoded in H.264 code and sent to the left video outputting interface of the remote endpoint; a corresponding relation of the middle and right audios and/or videos of the local telepresence terminal with outputting interfaces of the remote endpoint is established likewise.

Step 605: the local telepresence terminal establishes sending channels to the remote endpoint. The local telepresence terminal determines a sending address of a sending channel, a channel identifier, and media outputting location information according to the remote capability set sent by the remote endpoint and the local capability set of the local telepresence terminal (including media encoding/decoding capability as well as a remote media outputting location and a media inputting location at the local telepresence terminal corresponding to the sending channel to be established), and opens media logical channels through an H.245 openLogicalChannel message, which message at least needs to carry the sending address (an IP address and a port number, for example, 10.11.12.13:10200) of a media logical channel, an encoding type and parameter (for example, G.711a audio), a channel identifier (for example, a channel No. 2 indicates that an audio is sent on a left channel), a local media inputting location (for example, a location 1 indicates that a left audio stream is input). After the remote endpoint receives this message, the remote endpoint responds with an H.245 openLogicalChannelAck message, which message at least carries the identifier and the receiving address (an IP address and a port number, for example, 10.11.12.14:5058) of the channel, the location identifier of the corresponding audio outputting device interface (for example, a location 7 indicates that a left audio stream is output).

Step 606: the local telepresence terminal establishes media logical channels for receiving streams from the remote endpoint. The local telepresence terminal receives the H.245 openLogicalChannel message from the remote endpoint, and determines the receiving address of the local telepresence terminal according to the media capability (for example, H.264) and the input location information (for example, location 4 indicates that a left video stream is input) as well as local media outputting location information in channel information, and feeds back an openLogicalChannelAck message including at least the receiving address (for example, 10.11.12.13:10206), the local media outputting location information (for example, a location 10 indicates that a left video stream is output). Meanwhile, the local telepresence terminal records the channel information including at least the channel identifier, the media capability and media inputting/outputting location information.

Step 607: multiple streams are transmitted between the local telepresence terminal and the remote endpoint respectively through the established media logical channels.

As for stream sending, an audio or video inputting device connected to the local telepresence terminal collects audio or video data respectively; then the collected data are encoded by the media encoding/decoding module and are forwarded to the media transfer module; and a stream is sent respectively through a corresponding media logical channel established above according to the corresponding relation between the location of a device interface and a media logical channel.

As for stream receiving, the media transfer module of the local telepresence terminal receives a stream from the remote endpoint, and sends, according to the location information of an outputting device corresponding to a media logical channel, the stream to a decoder corresponding to the media encoding/decoding module to decode; then the decoded stream is output to an external audio or video outputting device at the corresponding interface to play.

Step 608: when the conference completes, the local telepresence terminal first closes the media logical channels, stops media receiving and sending, and finally deletes the session.

For the case in which multiple audio streams are sent through one sending channel and received through one receiving channel, and multiple video streams are sent through one sending channel and received through one receiving channel, the operation process of the telepresence method is similar to that shown in FIG. 6. The difference lies in that during media logical channel establishment, one audio stream sending and receiving channel, and one video stream sending and receiving channel are established according to the negotiated media encoding/decoding capability; during stream transmission, all audio streams are transmitted through a same media logical channel, and all video streams are transmitted through a same media logical channel; moreover, the audio streams and/or the video streams are distinguished by packet header information; after receiving a stream, the local telepresence terminal and the remote endpoint parse the packet header information and send the stream to an audio outputting device and/or multiple video outputting at a corresponding position to play.

To sum up, in the disclosure, with the disclosure, a telepresence terminal has multiple audio and video inputting and outputting interfaces capable of connecting multiple audio inputting devices and audio outputting devices and/or video inputting devices and video outputting devices; thus, it is only required to deploy one telepresence terminal for a single meeting room such that multiple audio and/or video streams may be processed; the deployment is simple, and a call with a single conference ID number can be implemented. As multiple streams of audio and/or video data are collected in a single meeting room, the data source is more accurate. As each audio and/or video inputting device collects data within a relatively fixed range, auditory positioning and life-size display required by a telepresence system can be achieved.

What described are merely preferred embodiments of the disclosure and are not intended to limit the scope of the disclosure.

The invention claimed is:

1. A telepresence system, comprising a telepresence terminal, multiple media inputting devices and multiple media outputting devices connected to the telepresence terminal, and a remote endpoint intercommunicating with the telepresence terminal, wherein
the telepresence terminal has multiple media inputting interfaces and multiple media outputting interfaces for connecting the multiple media inputting devices and the multiple media outputting devices, and is configured to: establish a session, exchange information on a location of a media inputting device inputting a media stream and a location of a media outputting device outputting the media stream, perform media capability negotiation, and establish a media logical channel with the remote endpoint; encode a local media stream input by one of the multiple media inputting devices, and send the encoded local media stream to the remote endpoint through an established media logical channel according to a location of the one of the multiple media inputting devices and a location of a remote media outputting device outputting the local media stream; receive and decode a remote media stream sent by the remote endpoint, and forward the decoded remote media stream to a local media outputting device at a local location corresponding to a location of a remote media inputting device inputting the remote media stream, so that the decoded remote media stream is played by the local media outputting device;
the multiple media inputting devices are configured to input collected media data to the telepresence terminal;
the multiple media outputting devices are configured to output media data decoded by the telepresence terminal; and
the remote endpoint is configured to: exchange the information on the location of the media inputting device inputting a media stream and the location of the media outputting device outputting the media stream, perform the media capability negotiation, establish a media logical channel with the telepresence terminal, and exchange media streams with the telepresence terminal based on an established media logical channels.

2. The telepresence system according to claim 1, wherein the telepresence terminal is configured for:
sending the remote endpoint a capability set of the telepresence terminal comprising local media encoding and decoding capability and location information of at least one of a media inputting device and a media outputting device connected to the telepresence terminal, and receiving a capability set of the remote endpoint comprising media encoding and decoding capability of the remote endpoint and location information of at least one of a media inputting device and a media outputting device at the remote endpoint.

3. The telepresence system according to claim 1, wherein a media logical channel comprises a sending channel and a receiving channel;
the media is of a type comprising at least one of an audio and a video;
the telepresence terminal is configured for sending media streams of one type through a sending channel and receiving media streams of one type through a receiving channel; and
a media stream is distinguished by packet header information comprising information on a type of the media stream, a location of a media inputting device inputting the media stream, and a location of a media outputting device outputting the media stream.

4. The telepresence system according to claim 1, wherein a media logical channel comprises a sending channel and a receiving channel;
the telepresence terminal is configured for sending a media stream through a respective sending channel and receiving a media stream through a respective receiving channel; and
a corresponding relation is established between a sending channel and information on a type of a media stream, a location of a media inputting device inputting the media stream, and a location of a media outputting device outputting the media stream; and a corresponding relation is established between a receiving channel and information on a type of a media stream, a location of a media inputting device inputting the media stream, and a location of a media outputting device outputting the media stream.

5. The telepresence system according to claim 4, wherein the telepresence terminal is configured to:
establish a sending channel according to negotiated media encoding and decoding capability, a local sending address and a remote receiving address, information on a location of a remote media outputting device outputting a media stream to be sent through the sending channel and a location of a local media inputting device inputting the media stream; and
establish a receiving channel according to negotiated media encoding and decoding capability, a remote sending address and a local receiving address, information on a location of a local media outputting device outputting a media stream to be received through the receiving channel and a location of a remote media inputting device inputting the media stream.

6. The telepresence system according to claim 1, wherein the telepresence terminal is configured to perform at least one of:
synchronizing to-be-sent media streams; and
synchronizing received media streams.

7. The telepresence system according to claim 1, wherein the remote endpoint is a Multipoint Control Unit (MCU) or a remote telepresence terminal.

8. A telepresence terminal having multiple media inputting interfaces and multiple media outputting interfaces for connecting multiple media inputting devices and multiple media outputting devices, the telepresence terminal comprising: a protocol signalling processing module, a media encoding and decoding module and a media transfer module, wherein the protocol signalling processing module is configured to: establish a session, exchange information on a location of a media inputting device inputting a media stream and a location of a media outputting device outputting the media stream, perform media capability negotiation, and establish a media logical channel with a remote endpoint;

the media encoding and decoding module is configured to: encode a local media stream input by one of the multiple media inputting devices, and provide the encoded local media stream to the media transfer module; decode a remote media stream sent by the remote endpoint provided by the media transfer module, and forward the decoded remote media stream to a local media outputting device at a local location corresponding to a location of a remote media inputting device inputting the remote media stream, so that the decoded remote media stream is played by the local media outputting device; and the media transfer module is configured to: send the encoded local media stream to the remote endpoint according to a location of the one of the multiple media inputting devices and a location of a remote media outputting device outputting the local media stream; receive the remote media stream sent by the remote endpoint, and provide, according to the location of the remote media inputting device inputting the remote media stream and the location of the local media outputting device outputting the remote media stream, the received remote media stream to the media encoding and decoding module for decoding.

9. The telepresence terminal according to claim 8, wherein the protocol signalling processing module is configured for:

sending the remote endpoint a capability set of the telepresence terminal comprising local media encoding and decoding capability and location information of at least one of a media inputting device and a media outputting device connected to the telepresence terminal, and receiving a capability set of the remote endpoint comprising media encoding and decoding capability of the remote endpoint and location information of at least one of a media inputting device and a media outputting device at the remote endpoint.

10. The telepresence terminal according to claim 8, wherein a media logical channel comprises a sending channel and a receiving channel;

the media is of a type comprising at least one of an audio and a video;

the media transfer module is configured for sending media streams of one type through a sending channel and receiving media streams of one type through a receiving channel; and a media stream is distinguished by packet header information comprising information on a type of the media stream, a location of a media inputting device inputting the media stream, and a location of a media outputting device outputting the media stream.

11. The telepresence terminal according to claim 8, wherein a media logical channel comprises a sending channel and a receiving channel;

the media transfer module is configured for sending a media stream through a respective sending channel and receiving a media stream through a respective receiving channel; and a corresponding relation is established between a sending channel and information on a type of a media stream, a location of a media inputting device inputting the media stream, and a location of a media outputting device outputting the media stream; and a corresponding relation is established between a receiving channel and information on a type of a media stream, a location of a media inputting device inputting the media stream, and a location of a media outputting device outputting the media stream.

12. The telepresence terminal according to claim 11, wherein the protocol signalling processing module is configured to:

establish a sending channel according to negotiated media encoding and decoding capability, a local sending address and a remote receiving address, information on a location of a remote media outputting device outputting a media stream to be sent through the sending channel and a location of a local media inputting device inputting the media stream; and establish a receiving channel according to negotiated media encoding and decoding capability, a remote sending address and a local receiving address, information on a location of a local media outputting device outputting a media stream to be received through the receiving channel and a location of a remote media inputting device inputting the media stream.

13. The telepresence terminal according to claim 8, wherein the media transfer module is configured to perform at least one of:

synchronizing to-be-sent media streams; and
synchronizing received media streams.

14. A telepresence method, wherein a telepresence terminal has multiple media inputting interfaces and multiple media outputting interfaces for connecting multiple media inputting devices and multiple media outputting devices, and comprises a protocol signalling processing module, a media encoding and decoding module and a media transfer module, the method comprising:

establishing, by the protocol signalling processing module, a session, exchanging information on a location of a media inputting device inputting a media stream and a location of a media outputting device outputting the media stream, performing media capability negotiation, and establishing a media logical channel with a remote endpoint;

encoding, by the media encoding and decoding module, a local media stream input by one of the multiple media inputting devices, and providing the encoded local media stream to the media transfer module; decoding a remote media stream sent by the remote endpoint provided by the media transfer module, and forwarding the decoded remote media stream to a local media outputting device at a local location corresponding to a location of a remote media inputting device inputting the remote media stream, so that the decoded remote media stream is played by the local media outputting device; and sending, by the media transfer module, the encoded local media stream to the remote endpoint according to a location of the one of the multiple media inputting devices and a location of a remote media outputting device outputting the local media stream; receiving the remote media stream sent by the remote endpoint, and providing, according to the location of the remote media inputting device inputting the remote media stream and the location of the local media outputting device outputting the remote media stream, the received remote media stream to the media encoding and decoding module for decoding.

15. The telepresence method according to claim 14, wherein the exchanging information on a location of a media inputting device inputting a media stream and a location of a media outputting device outputting the media stream, performing media capability negotiation comprises:

sending, by the protocol signalling processing module, the remote endpoint a capability set of the telepresence terminal comprising local media encoding and decoding capability and location information of at least one of a media inputting device and a media outputting device connected to the telepresence terminal, and receiving a capability set of the remote endpoint comprising media encoding and decoding capability of the remote endpoint and location information of at least one of a media inputting device and a media outputting device at the remote endpoint.

16. The telepresence method according to claim 14, wherein a media logical channel comprises a sending channel and a receiving channel;

the media is of a type comprising at least one of an audio and a video;

media streams of one type are sent through a sending channel, and media streams of one type are received through a receiving channel; and a media stream is distinguished by packet header information comprising information on a type of the media stream, a location of a media inputting device inputting the media stream, and a location of a media outputting device outputting the media stream.

17. The telepresence method according to claim 14, wherein a media logical channel comprises a sending channel and a receiving channel;

a media stream is sent through a respective sending channel; a media stream is received through a respective receiving channel; and a corresponding relation is established between a sending channel and information on a type of a media stream, a location of a media inputting device inputting the media stream, and a location of a media outputting device outputting the media stream; and a corresponding relation is established between a receiving channel and information on a type of a media stream, a location of a media inputting device inputting the media stream, and a location of a media outputting device outputting the media stream.

18. The telepresence method according to claim 17, wherein the establishing a media logical channels comprises:

establishing a sending channel according to negotiated media encoding and decoding capability, a local sending address and a remote receiving address, information on a location of a remote media outputting device outputting a media stream to be sent through the sending channel and a location of a local media inputting device inputting the media stream; and establishing a receiving channel according to negotiated media encoding and decoding capability, a remote sending address and a local receiving address, information on a location of a local media outputting device outputting a media stream to be received through the receiving channel and a location of a remote media inputting device inputting the media stream.

19. The telepresence method according to claim 14, further comprising: performing, by the media transfer module, at least one of:

synchronizing to-be-sent media streams; and synchronizing received media streams.

20. The telepresence method according to claim 14, wherein the remote endpoint is a Multipoint Control Unit (MCU) or a remote telepresence terminal.

* * * * *